Oct. 22, 1968    R. S. McCONVILLE    3,406,452
DENTAL RUBBER DAM FRAME
Filed Sept. 2, 1966
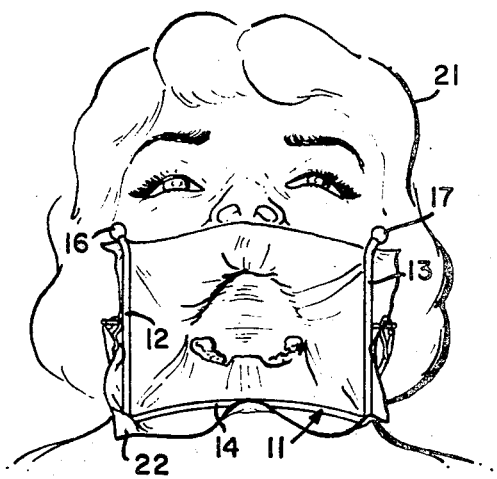
FIG. 1
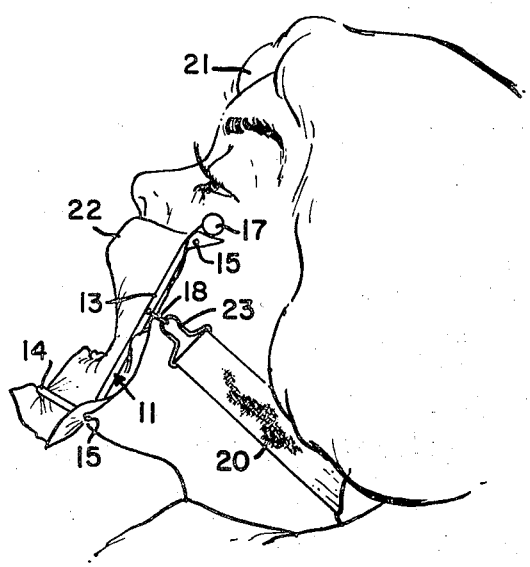
FIG. 2
FIG. 3
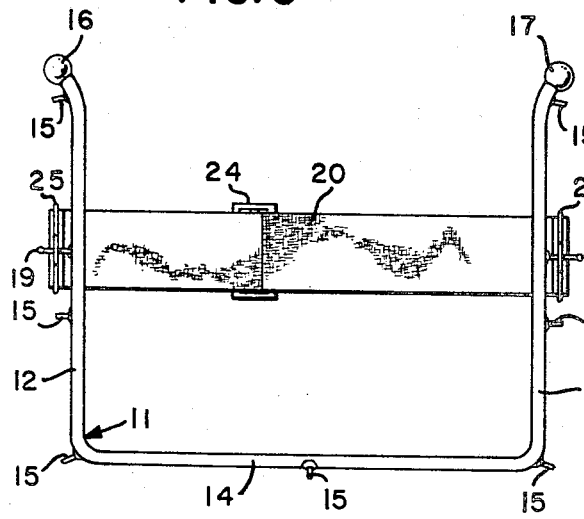
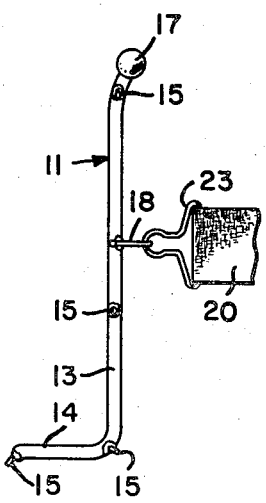
FIG. 4
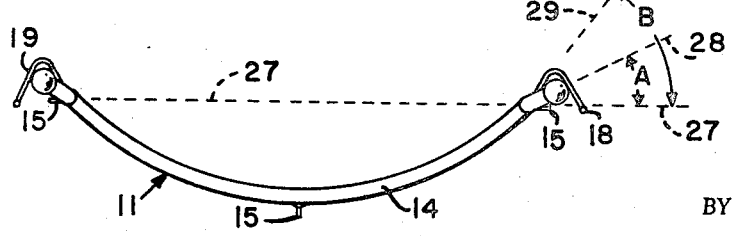
FIG. 5
INVENTOR.
RICHARD S. McCONVILLE
BY Jack M. Wiseman
ATTORNEY

United States Patent Office 3,406,452
Patented Oct. 22, 1968

3,406,452
DENTAL RUBBER DAM FRAME
Richard S. McConville, 100 O'Connor Drive,
San Jose, Calif. 95128
Filed Sept. 2, 1966, Ser. No. 577,058
6 Claims. (Cl. 32—35)

ABSTRACT OF THE DISCLOSURE

A dental dam frame which includes a contoured, rigid, U-shaped frame having an elongated base portion and a stem portion emanating from each end of the base portion. A plurality of lines are attached to the U-shaped frame to enable dental dam material to be attached thereto. The stem portions have substantially equal lengths and their longitudinal axes are substantially parallel. Also, each stem portion is provided with a hook to engage fastening means which enable the U-shaped frame to be retracted against the face of a patient, thus inhibiting turning of the U-shaped frame when it is properly positioned for use. The base portion of the frame is curved outwardly away from the longitudinal axes of the stem portions a sufficient distance to prevent the base portion from pressing against the patient's chin when the frame is properly positioned for use.

---

This invention relates to dental rubber dam apparatus, and more particularly to a dental dam rubber frame.

Many dental procedures and practices make is desirable, or necessary, to isolate the area being worked on from other areas of the oral cavity and fluids formed therein, in order to insure the cleanliness of the work area. One prior art dental rubber dam apparatus used for this purpose utilizes a U-shaped frame member across which an elastic dental dam material, such as rubber, can be attached. This U-shaped frame is large enough to enable the elastic dam material to completely cover the patient's mouth or oral opening so that suitable clamps may be used to position a portion of the dam material within the oral cavity and over a plurality of teeth and adjacent gum area. One or more openings in the dam material positioned by these clamps provide access to the desired working area which is isolated from oral fluids and other oral areas by the elastic dam material. In use, the U-shaped frame which holds the elastic material is positioned around the patient's mouth such that the base portion of the frame is adjacent the patient's chin and the stem, or leg, portions of the frame are located to each side of the patient's mouth. Even though the base portion of this prior art dental dam frame is slightly bowed, the U-shaped frame is basically flat which prevents the frame from being retracted against the patient's face. Any attempt to so retract the frame causes the base portion of the frame to press against the patient's chin causing discomfort. This prior art dental dam apparatus is preferably attached to the patient's head by the use of dental floss or other suitable yarn. However, the use of such material is uncomfortable to the patient as well as difficult and cumbersome to use. Consequently, many users make no attempt to secure the frame to the patient's head. Hence, the U-shaped frame when not secured has a tendency to rotate, or turn, which not only interferes with the performance of the work to be achieved, but also causes the ends of the U-shaped frame stem portions remote from the base portion to be deflected toward the patient's eyes giving rise to potential eye damaging accidents.

Accordingly, one object of this invention is to provide improved dental dam apparatus.

Another object of this invention is to provide an improved dental dam frame.

Another object of this invention is to provide a contoured dental dam frame which is adapted not to be rotated or turned when positioned around a patient's oral cavity.

Still another object of this invention is to provide an improved dental dam frame which does not press against a patient's chin when positioned around a patient's mouth in a manner that inhibits rotation or turning of the frame.

A further object of this invention is to provide a dental dam frame which may be used with adult patients.

A further object to this invention is to provide a dental dam frame which may be used with child patients.

A still further object of this invention is to provide a U-shaped dental dam frame which is adapted to prevent accidental eye damage.

Briefly described, these and other objects of the present invention are accomplished by dental dam apparatus which includes a contoured, rigid, U-shaped frame having an elongated base portion and a stem portion emanating from each end of the base portion. A plurality of tines, or projections, are attached to the U-shaped frame to enable dental dam material to be attached thereto. The stem portions have substantially equal lengths and their longitudinal axes are substantially parallel. Also, each stem portion is provided with a hook to engage fastening means which enable the U-shaped frame to be retracted against the face of a patient, thus inhibiting rotation, or turning, of the U-shaped frame when it is properly positioned for use. The base portion of the frame is curved outwardly away from the longitudinal axes of the stem portions a sufficient distance to prevent the base portion from pressing against the patient's chin when the frame is properly positioned for use.

In accordance with another feature of this invention, the ends of the stem portions remote from the base portion are bent laterally outwardly from one another, are contoured to fit the human face in the area of the cheek bone, and are free of any abrupt angles to prevent accidental damage to a patient's eyes.

In accordance with another feature of this invention, one U-shaped frame is provided for child patients and another U-shaped frame, having different dimensions, is provided for adult patients.

These and other objects, features and advantages of the present invention will be readily apparent from consideration of the following detailed description when read in conjunction with the accompanying drawings, in which like reference characters designate like or corresponding parts throughout the several views, and wherein:

FIGS. 1 and 2 illustrate the use of improved dental dam apparatus in accordance with the teachings of the present invention;

FIG. 3 is a front view illustration of the dental dam frame of this invention;

FIG. 4 is a side view illustration of the dental dam frame of FIG. 3; and

FIG. 5 is a top view illustration of the dental dam frame of FIG. 3.

Referring now to FIGS. 3, 4 and 5, there is illustrated an improved dental dam rubber frame in accordance with the present invention which comprises a contoured, rigid, U-shaped frame 11 having an elongated horizontal, or base portion 14. The vertical, or stem portions 12 and 13, emanate from each end of the base portion 14. The stem portions 12 and 13 have substantially equal lengths and their longitudinal axes are substantially parallel. The end portion of each stem 12 and 13 remote from the base portion 14 is bent, or curved, laterally outward from the other, as illustrated. Each bent portion may be described as being an arc of a circle, and each bent portion is further contoured to fit the human face at the cheek bone area as described below in conjunction with FIG. 5. Balls 16 and 17, or other suitable rounded projections are attached to the end of the stem portions 12 and 13, respectively, to cause the ends of the stem portions 12 and 13 to be free of abrupt angles.

The base portion 14 is curved outwardly from, and substantially perpendicular to, the longitudinal axis of the stem portions 12 and 13 with the curve of the base portion 14 being defined as an arc of a circle. A plurality of projections, or tines 15, are attached to the U-shaped frame by any suitable means, such as soldering, to enable elastic dental dam material to be attached to the frame 11. The tines 15 on the stem portions 12 and 13 emanate therefrom in opposite directions, as illustrated, and the tine 15 located intermediate the ends of the base portion 14 emanates therefrom such that it is at an angle of 30 degrees with a flat plane 27, defined by the stem portions 12 and 13.

Hooks 18 and 19 are attached to the stem portions 13 and 12, respectively, intermediate the ends thereof, as illustrated by FIGS. 3 and 4, by any suitable means, such as soldering. The portion of each hook 18 and 19 adjacent its associated stem 13 and 12, preferably emanates therefrom at an angle defined by the arc 29 of the curved base portion 14 as illustrated by FIG. 5. Eyelets 23 and 25, secured to opposite ends of a flat elastic strap 20, engage the hooks 18 and 19, respectively, to enable the frame 11 to be retracted against a patient's face as illustrated in FIGS. 1 and 2 and described hereinbelow. The strap 20 contains means 24 for varying its length in a manner that is well-known in the art. The entire U-shaped frame 11 is preferably plated, or coated, with a suitable material, such as chromium, to enable it to be easily sterilized.

Before describing the dimensions and other aspects of the U-shaped frame 11, its use as part of a complete dental dam apparatus will be described in conjunction with FIGS. 1 and 2, which illustrated improved dental apparatus in accordance with this invention properly positioned around a patient's 21 oral cavity. As illustrated, the base portion 14 is in proximity to, but not pressing against, the patient's 21 chin. The contoured stem portions 12 and 13 lie in the area of the patient's 21 cheeks in back of, and to each side of the oral cavity. Rotation of the U-shaped frame 11 is inhibited, or prevented, by the slight tension created by the neckband. The stem portions 12 and 13 are short enough to be below the patient's eyes and spaced far enough apart to also be located to the far side of, and away from, the patient's eyes. Also, the ends of the stem portions 12 and 13 are curved laterally outward from one another away from the patient's 21 eyes, as illustrated by FIG. 1, and are free of any abrupt angles that may tend to injure the eyes in the event of an accident when attaching, or removing, the frame 11. As will now be apparent, the pronounced curve of the base portion 14 enables the contoured stem portions 12 and 13 to be retracted against the patient's face in such a manner that rotation, or turning, of the frame is inhibited and no pressure is applied to the patient's chin.

The U-shaped frame 11 is held in position by the flat, elastic strap 20, which goes around the back of the patient's neck and has its ends attached to opposite stem portions 12 and 13 by way of the hooks 18 and 19 and eyelets 23 and 25, respectively. The relatively wide surface of the flat, elastic, strap 20 is considerably more comfortable to the patient 21 than dental floss, or other yarn, tied around the neck or head. The elastic strap is also easy to use and firmly holds the frame 11 in position.

A thin sheet of elastic dental dam material 22, such as sheet rubber, is placed over the oral cavity after which the U-shaped frame 11 is positioned over the dental dam material as illustrated in FIGS. 1 and 2. The dental dam material is secured to the frame 11 by turning edges of the dental dam material 22, extending outside of the frame 11, over and pressing it against the tines 15 (FIGS. 3, 4 and 5) causing the tines to engage the dental dam material 22 thereby holding it in place. Alternatively, the sheet dental dam material 22 may be placed over the frame 11, and then pressed against the tines such that the tines engage the dam material 22 thereby holding it in place. After placing the dam material 22 on the frame 11, the frame is positioned as illustrated in FIGS. 1 and 2 by the strap 20. Clamps (not shown) position a portion of the dental dam material 22 within the oral cavity such that the material 22 covers a plurality of teeth and adjacent gum area. One or more openings are provided in the dam material 22, which is positioned by these clamps to provide access to the desired working area that is to be isolated from oral fluids and other oral areas to insure the cleanliness of the work area. For example, FIG. 1 illustrates the dam material 22 clamped over the lower teeth with an opening in the dam material to provide access to one side of the lower jaw teeth and another opening in the dam material to provide access to the other side of the lower jaw teeth. The dental dam material is generally marked with an upper and lower teeth outline which enables openings to be made in the material 22 before it is positioned within the oral cavity.

It was found that the proper functioning of the U-shaped frame 11 was dependent upon its dimensions and that a frame 11 dimensioned to function properly with child patients was not entirely satisfactory for adult patients. Accordingly, in practicing the present invention two U-shaped frames 11 are utilized; one for child patients and one for adult patients. The adult frame 11 was constructed from a metal rod about 13½ inches long and having a diameter of about ⅛ inch. The width of the base portion 14 was about 4⅞ inches and had an arc defined by a circle having a radius of about 3 inches. Consequently, the width of the frame 11 was about 4⅞ inches with the distance between the stem portions 12 and 13 being about 4⅝ inches, due to the ⅛ inch diameter of each stem portion 12 and 13. Each stem portion 12 and 13 had a length of about 3⅞ inches including the ⅛ inch diameter of the base 14 rod portion and excluding the balls 16 and 17. About ¼ inch of length at each end of the stems 12 and 13 remote from the base 14 was utilized to produce the lateral bending which could be a curve defined by an arc of a circle having a radius greater than the circle defining the arc of the base portion 14.

The U-shaped frame used with child patients was also constructed from a rod having a diameter of about ⅛ inch. The width of the base portion 14 was about 4⅜ inches and had an arc defined by a circle having a radius of about 2⅞ inches. Consequently, the width of the frame 11 was about 4⅜ inches with the distance between the stem portions 12 and 13 being about 4⅛ inches, due to the ⅛ inch diameter of each stem portion. Each stem portion 12 and 13 had a length of about 3⅝ inches including the ⅛ inch diameter of the base 14 rod portion and excluding the balls 16 and 17. About ¼ inch of length at each end of the stems 12 and 13 remote from the base 14 was utilized to produce the lateral bending which could be a curve defined by an arc of a circle having a radius greater than the circle defining the arc of the base portion 14.

As discussed above, the laterally bent ends of each stem portion 12 and 13 are contoured to more nearly fit the human face in the area of the cheek bones. As described above, the bend or curve per se at the end of each stem portion 12 and 13 may be defined as an arc of a circle. In order to more nearly contour the stem portions to the human face, the bent ends of the stem portions 12 and 13, as illustrated by FIG. 5, make an angle A with the plane 25, defined by the parallel portions of the stems 12 and 13, which is about half the value of the angle B between the plane 25 and the arc 29 of the curved base portion 14. In other words, the lateral bend at each end of the stems 12 and 13 is not in the same arc as the curve of the base portion 14 but rather define an arc 28 of greater radius to more nearly fit the contour of the face in the area of the cheek bones. Also, the tines 15 in the stem portions 12 and 13, preferably emanate therefrom at an angle of the arc 28 of greater radius, in the same plane as the lateral bend at the end of the stem portions 12 and 13.

For both the adult and child frames 11, balls 16 and 17 having a diameter of ¼ inch were attached to the ends of the stems 12 and 13, respectively. The tines 15 had a length of 2.5 millimeters and the hooks 18 and 19 were fabricated from 28 gauge wire.

What has been described is improved dental dam apparatus which utilizes a contoured, rigid, U-shaped frame which is adapted not to press against a patient's chin when properly positioned, is contoured in a manner so that it can be retracted comfortably without rotation, does not contain abrupt angles that could accidentally injure a patient's eyes, and which may be configured for use with child or adult patients.

It is to be understood that modifications and variations of the invention disclosed herein may be resorted to without departing from the spirit of the invention and the scope of the appended claims.

What is claimed is:

1. An improved dental dam frame which is contoured to be retractable against a portion of a patient's face surrounding the oral cavity comprising, a rigid U-shaped member having an elongated base portion and a stem portion emanating from each end of said base portion, and a plurality of lines attached to said U-shaped frame to enable dental damming material to be attached thereto, said stem portions having substantially equal lengths and having their longitudinal axes substantially parallel, each said stem portions being adapted to engage fastening means which enables said U-shaped frame to be retracted against the face of a patient in order to inhibit rotation of said U-shaped frame when it is properly positioned for use, said base portion being curved outwardly away from the longitudinal axes of said stem portions such that said base portion does not impinge upon the chin of a patient when said U-shaped frame is properly positioned for use, the ends of said stem portions remote from said base portion bend laterally outwardly from one another.

2. The improved dental dam frame according to claim 1 wherein said laterally bent end portions are free of abrupt angles.

3. The improved dental dam frame according to claim 1 further including a rounded member attached to the end of each said stem portion remote from said base portion.

4. The improved dental dam frame according to claim 1 wherein the curve of said base portion constitutes an arc of a circle, the lateral bend of said stem portions remote from said base portion constitutes an arc of a circle, and the radius of the arc defining the curved stem portions is greater than the radius of the arc defining the curved base portion.

5. The improved dental dam frame according to claim 1 wherein the angle between a plane defined by the parallel portions of the stems and said lateral bend at the ends of said stems is less than the angle of the curve between said base portion and said plane.

6. The improved dental dam frame according to claim 4 wherein the angle between a plane defined by the parallel portions of the stems and the arc of said lateral bends is about half of the angle of the arc of said curved base portion with said plane.

References Cited

UNITED STATES PATENTS 682,308  9/1901  Young _____ 32—35

LOUIS G. MANCENE, *Primary Examiner.*

ROBERT PESHOCK, *Examiner.*